(12) United States Patent
Schlemmer

(10) Patent No.: US 10,997,416 B2
(45) Date of Patent: May 4, 2021

(54) SYSTEM FOR AUTOMATICALLY RECOGNIZING PLANTS

(71) Applicant: M-FARMS GMBH, Gräfelfing (DE)

(72) Inventor: Christian Schlemmer, Munich (DE)

(73) Assignee: M-FARMS GMBH, Gräfelfing (DE)

( * ) Notice: Subject to any disclaimer, the term of this patent is extended or adjusted under 35 U.S.C. 154(b) by 41 days.

(21) Appl. No.: 16/319,451

(22) PCT Filed: Feb. 24, 2017

(86) PCT No.: PCT/EP2017/054318
§ 371 (c)(1),
(2) Date: Jan. 21, 2019

(87) PCT Pub. No.: WO2018/015030
PCT Pub. Date: Jan. 25, 2018

(65) Prior Publication Data
US 2019/0236367 A1    Aug. 1, 2019

(30) Foreign Application Priority Data
Jul. 20, 2016   (DE) ............... 20 2016 004 430.4

(51) Int. Cl.
*G06K 9/00* (2006.01)
*G06F 16/51* (2019.01)
(Continued)

(52) U.S. Cl.
CPC ......... *G06K 9/00671* (2013.01); *G06F 16/51* (2019.01); *G06K 9/00* (2013.01);
(Continued)

(58) Field of Classification Search
None
See application file for complete search history.

(56) References Cited

U.S. PATENT DOCUMENTS 9,417,224 B1 * 8/2016 Shah .................. G01N 33/0098

FOREIGN PATENT DOCUMENTS

DE    4329343 A1    3/1995
DE    10110979 A1    9/2002
(Continued)

OTHER PUBLICATIONS

Scotford, I. et al., "Applications of Spectral Reflectance Techniques in Northern European Cereal Production: A Review," Biosystems Engineering, vol. 90, No. 3, Mar. 2005, 16 pages.
(Continued)

*Primary Examiner* — Leon Flores
(74) *Attorney, Agent, or Firm* — McCoy Russell LLP

(57) ABSTRACT

The disclosure relates to a system for automatic recognition of plants, including a central server unit, a network, an automatic picture processing unit, a plant database unit, in which plant data are stored, a picture database unit, in which picture data related to plants are stored, and a mobile device with a camera, the camera of the mobile device configured to provide picture data of a plant and the picture data transmitted via the network to the server unit, the automatic picture processing unit together with the plant database unit and the picture database unit on the basis of the transmitted picture data is configured to perform a comparison with data in the plant database unit and the picture database unit and the transmitted picture data of the plant such, that the plant is defined and the definition can be is transmitted back to the mobile device.

10 Claims, 1 Drawing Sheet

(51) Int. Cl.
G06K 9/62 (2006.01)
A01M 7/00 (2006.01)
H04M 1/02 (2006.01)

(52) U.S. Cl.
CPC ......... *G06K 9/6201* (2013.01); *A01M 7/0089* (2013.01); *G06K 2209/17* (2013.01); *G06K 2209/27* (2013.01); *H04M 1/0202* (2013.01)

(56) References Cited

FOREIGN PATENT DOCUMENTS

| | | |
|---|---|---|
| DE | 10245900 A1 | 4/2004 |
| DE | 102010048298 A1 | 4/2012 |
| WO | 2006117581 A1 | 11/2006 |

OTHER PUBLICATIONS

Ahmad, I. et al., "Weed Classification Based on Haar Wavelet Transform via k-Nearest Neighbor (k-NN) for Real-Time Automatic Sprayer Control System," Proceedings of the 5th International Conference on Ubiquitous Information Management and Communication (ICUIMC '11), Feb. 21, 2011, Seoul, Korea, 6 pages.

Fukatsu, T. et al., "Web-based sensor network system "Field Servers" for practical agricultural applications," Proceedings of the 2014 International Workshop on Web Intelligence and Smart Sensing (IWWISS '14), Sep. 1, 2014, Saint Etienne, France, 6 pages.

Rahman, M. et al., "Smartphone-based hierarchical crowdsourcing for weed identification," Computers and Electronics in Agriculture, vol. 113, Apr. 2015, 10 pages.

Behmann, J. et aL, "A review of advanced machine learning methods for the detection of biotic stress in precision crop protection," Precision Agriculture, vol. 16, No. 3, Jun. 2015, 22 pages.

Ahmad, I. et al., "Weed Classification Bases on Haar Wavelet Transform via k-Nearest Neighbor (k-NN) for Real-Time Automatic Sprayer Control System," Proceedings of the 5th International Conference on Ubiquitous Information Management and Communication, Feb. 21, 2011, Seoul, Korea, 6 pages.

ISA European Patent Office, International Search Report Issued in Application No. PCT/EP2017/054318, dated May 23, 2017, WIPO, 6 pages.

* cited by examiner

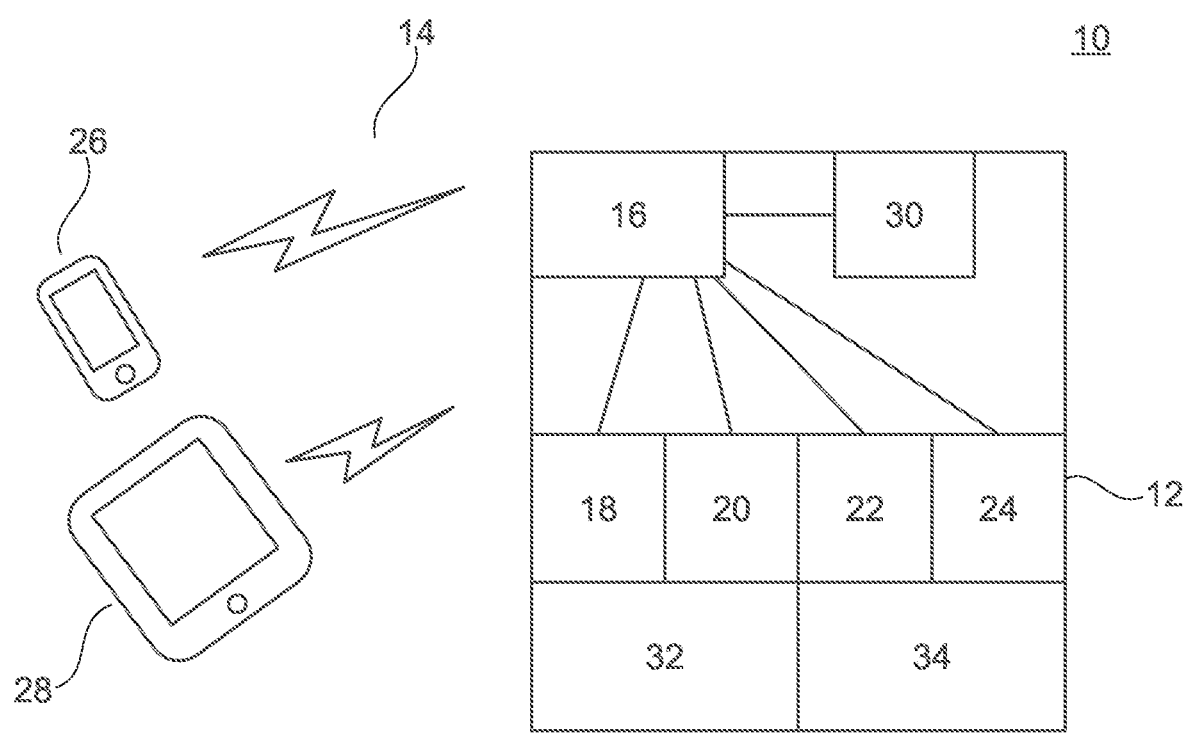

SYSTEM FOR AUTOMATICALLY RECOGNIZING PLANTS

CROSS-REFERENCE TO RELATED APPLICATION

The present application is a U.S. National Phase of International Patent Application Serial No. PCT/EP2017/054318 entitled "SYSTEM FOR AUTOMATICALLY RECOGNIZING PLANTS," filed on Feb. 24, 2017. International Patent Application Serial No. PCT/EP2017/054318 claims priority to German Patent Application No. 20 2016 004 430.4 filed on Jul. 20, 2016. The entire contents of each of the above-referenced applications are hereby incorporated by reference for all purposes.

TECHNICAL FIELD

The present invention relates to a system for automatic recognition of plants.

BACKGROUND AND SUMMARY

In the field of agriculture, but also in the field of botany and education in connection with professions related to agriculture or forestry, but also in the field of biology and botany, it is necessary to recognize plants accurately.

From DE 43 29 343 A1 is already known a field useable picture analytic method for automatic recognition and removing of weeds. Here, a computing device of a camera is installed onside, to recognize weeds.

However, only a certain amount of weeds can be detected and furthermore, the system according to DE 43 29 343 A1 is relatively large and therefore cannot be handled very well.

From DE 10 2010 048 298 A1 an installation of the detection of growth of a plurality of biological probes is known. This system is especially related to do the phenotyping and the characterization of plants. By means of this installation, the growth of plants will be detected. These plants will be arranged in a shelf. A camera is mounted to a moving device and will be moved for several periods of time along the same moving path. By this, several single pictures will be put together as a mosaic from the plurality of samples, which will then be stored in a database and be shown as a mosaic graphic.

From DE 102 45 900 A1 a picture based request system for searching machines for mobile devices with an integrated camera is known. By means of this system, objects can be recognized automatically. However, the system relates to the recognition of sights of a city or to the recognition of plates, which have a text in another language, which the user cannot speak. Other parts of use are city guides or museum guides and/or face recognition systems.

From DE 101 10 979 A1 is known a system and arrangement for linking of optical recognized patterns with information. This arrangement is used for linking of optically detected patterns of an object with information with a camera for detecting the pattern, further being equipped with a pattern storage, in which reference patterns may be stored, with an editing unit, which is comparing the reference pattern with the detected patterns and with an information storage, in which the information in relation to the reference pattern is stored, with a further module, which is processing the information. Main applications, which are named in this application, are universal remote, controllers in connection with CD players or TVs.

It is an object of the present invention to provide a system for automatic recognition of plants, especially in that that plants can be easily and accurately be recognized and that an accurate recognition with at the same time immediate workflow, i.e. recognition and definition within seconds or minutes is possible.

This object is solved according to the present invention with a system for automatic recognition of plants. Accordingly, a system for automatic recognition of plants includes at least one central server unit, at least one network, at least one automatic picture processing unit, at least one plant database unit, in which plant data are stored, at least one picture database unit, in which picture data related to plants are stored, and with at least one mobile device with at least one camera, wherein the central server unit is in use via the network with the mobile device, wherein by means of the camera of the mobile device picture data of a plant can be provided and transmitted via the network to the server unit, wherein the automatic picture processing unit is capable together with the plant database unit and the picture database unit on the basis of the transmitted picture data to perform a comparison with data in the plant database unit and the picture database unit and the transmitted picture data of the plant and that they are analyzed such, that the plant can be defined and the definition can be transmitted back to the mobile device via the network by means of the server unit.

The invention is based on the basic idea that the system for automatic recognition of plants is provided, wherein for the definition and recognition of the plant it is necessary to take a picture with the mobile device of the plant in any growth state of the plant. This picture will then be transmitted to the server unit and there by means of an automatic picture processing unit processed, automatically recognized and by means of a comparison with a database, in which plant data and a further database, in which the raw picture data of the respective plant are stored, compared.

By means of this comparison it is possible to automatically check the plant being depicted in the picture to recognize automatically the plant being depicted on the picture and to transfer this information back to the mobile device.

Furthermore, it is possible that a plant protection product storage unit is provided, in which plant protection product data are stored, wherein further in the plant protection product storage unit linking data are stored, with which the plant protection product data with the picture data and/or plant data by means of a data analysis module can be linked. It is possible in this regard that the plant data and also the picture data are so called weed data or related to weeds. In particular, in the agricultural or forestry area it may be of interest to define plants in any phase of growth and at any time of the year alone on the basis of picture data and based on this definition also receive a proposal, which plant protection product, especially pesticide can be used or should be used to remove unwanted plants.

Furthermore, it is possible that the plant protection product data include substance data and/or manufacturer data related to the manufacturer of the plant protection product. By providing the active substance data, it is possible to provide information by means of the system related to the plant protection product to be used and its active substances and active substance groups, so that the selection of the suitable plant protection product(s) is simplified. It is especially possible that a preference with respect to a specific manufacturer of a plant protection product is possible. Thereby, it is easier for the user of the system to do a pre-selection so that he gets a selection of available plant protection products and he does not have to scroll through a plurality of options and then has to select there again.

Moreover, there may be a filter module, which is capable and/or arranged such that only manufacturing data of a specific manufacturer of a plant protection product is possible for linking the plant protection data with the picture data and/or the plant data by means of the analysis module. By this pre-selection the handling of the overall system can be simplified. Furthermore, by means of the pre-selection of the manufacturing data also the procedure of data requests can be simplified and made faster. In particular, it is possible that loss data must be transferred and transmitted and also in a search must be done in a smaller data volume. By this, the request time and also the data volume to be transmitted is reduced.

Furthermore, the picture data may comprise location data, such as GPS data. By linking the mere picture data with location data it becomes possible that the existence of specific species of plants can be linked with location data and thus, this kind of information can be then used over the whole area, which is used for agriculture or forestry. It is also possible that in connection with the extinction of weeds suitable weed destruction products can be used at the right location and thus, the process of distribution is simplified.

Moreover, the picture data may additionally comprise date data. By the date data it is possible to make a prediction and analysis to the growth state of the plant data being enclosed in the picture data. Depending on the time of the year and the date a plant has different growth states, which can then better be brought in context. By this, also the time, which is necessary for a databased request and for an analysis, can be reduced. It is possible that in the plant data module the stored data are sorted depending on the time of the year or that a selection can be done based on the time of the year.

The picture data can also comprise time of the day data. By such information it becomes possible that light and shadow effects can be taken into account and doing the analysis. By this, the quality of the analysis can be improved.

Furthermore, the mobile device may be a mobile phone, especially a smartphone. The smartphone may be especially a smartphone with a camera and respective link or links to the Internet.

Furthermore, it is possible that the mobile device is a tablet computer. Especially, the tablet computer can be tablet with a camera function and link to the Internet.

It is also possible that furthermore a plant disease database unit is provided in which plant disease data are stored, furthermore, wherein in the plant disease database unit link data are stored, with which the plant disease data can be linked with picture data and/or plant data by means of the data analysis module. It is especially possible that on the basis of recognized plant diseases, which may be detected automatically by the system, especially on the basis of color, structure and for example changes in color or changes in structure of the plant a suitable plant protection product can be selected. It is also possible that only the plant disease is detected automatically to come to conclusions for further measurements in the agricultural or forestry area.

It is also possible that furthermore a plant pest database unit is provided in which plant pest data are stored, wherein in the plant pest database unit linking data are stored, by means of which a plant pest data can be linked with picture data and/or plant data by means of the data analysis module. By this, the advantages achieved that by taking a picture of a plant and the respective and related picture data also plant pests can be recognized such as aphid, beetles, fleas, insects or also eating patterns, which can then be compared with information data stored within the system. The user of the system can be provided with respective information, which kind of plant pests are present. Furthermore, it is possible that the user receives automatically information by the system, which kind of plant protection product should be used in connection with the recognized plant pests.

BRIEF DESCRIPTION OF THE DRAWINGS

Further details and advantages of the invention shall now be described with an embodiment in connection and as shown in the drawing.

The only FIGURE (FIG. 1) shows schematically the general layout of the present invention, especially a possible embodiment of a system for automatic detection of plants.

DETAILED DESCRIPTION

The only drawing (FIG. 1) shows a system 10 for automatic recognition of plants.

The system 10 comprises a central server unit 12.

Furthermore, there is a network 14, here the Internet, by means of which the central server unit 12 may be in data exchange with other devices.

The server unit 12 comprises an automatic picture processing unit 16, a plant database unit 18, a picture database unit 20, a plant protection product database 22 and a filter module 24. The server unit 12 comprises a data analysis module 30.

In the plant database unit 18 the plant data are stored.

In the picture database unit 20 picture data related to plants are stored, typically related to plants, which are also stored in the plant database unit 18.

The picture data related to plants are plant picture data for the whole circle of the year related to plants in all kind of growth stages and embodiments.

The plant protection product database unit 22 is configured such that in it plant protection data are stored and furthermore, also linking data are stored, by means of which the plant protection product data can be linked with picture data and plant data via the data analysis module 30.

Furthermore, also the manufacturing data related to the manufacturer of a plant protection product is part of the plant protection product data.

The filter module 24 is configured such that by means of a filter module 24 it can be preset or selected that only manufacturer data of a specific manufacturer of a plant protection product can be used for the linking of the plant protection product data with the picture data and the plant data by means of the data analysis module 30.

By means of the data analysis module 30 linking data, which has stored in the plant protection product database 22, can be linked with picture data and plant data.

Furthermore, there is a plant disease database unit 32, in which plant diseases data are stored. Furthermore, in this plant disease protection database unit 32 linking data are stored, by means of which plant disease data can be linked with picture data and plant data by means of the data analysis module 30.

Additionally, there is a plant pest database unit 34, in which plant pest data are stored. In this plant pest database unit 34 linking data are stored by means of which plant pest data can be linked with the picture data and plant data by means of the data analysis module 30.

The picture data can comprise further location data, here GPS data, date data and also timing data, i.e. a so-called time stamp.

The system 10 comprises mobile devices such as a smartphone 26 or a tablet pc 28. The smartphone 26 can be for example an iPhone and the table pc can be for example an iPad.

The function of the system 10 can be described as follows:

By means of the smartphone 26 or the tablet pc 28 the user can take a picture on an agricultural area or a forestry area, wherein the picture is a picture of the plant to be analyzed.

This can be done by means of an app or directly by means of the camera function. The picture is then also attached with the location data and with a time stamp and this kind of information will then be transmitted via the network 14, i.e. the mobile communication network and the Internet to the central server unit 12.

The central server unit 12 comprises data input and output means, by means of which data can be received, but also transmitted back to the mobile devices.

In the central server unit 12 an analysis of the transmitted pictures is performed by means of the automatic picture processing unit 16 to compare the information contained in the picture data related to a plant on the basis of in the picture database unit 20 contained picture data and in connection with the plant database unit 18 to find out the respective plant automatically.

After the recognition of the plant by means of the data analysis module 30 it is possible to select automatically on the basis of the plant protection product data contained in a plant protection product database unit 22 a proposal, which weed killer or plant protection product should be used.

On the basis of the transmitted picture data the data analysis module 30 may also recognize on the basis of the plant disease database unit 32 whether and which plant diseases are present. Here, especially on the basis of color and/or structure or the specific amendments it can be detected, whether or which plant disease is present. This process also is done automatically.

On the basis of picture data acquired, which are checked against each other, it is also possible to detect, whether plant pests are present. Thereto, in the plant pest database 34 the stored data are used and those data are then linked with further present data. For example it is possible that the plant protection product data, which are stored in the plant protection product database 22 are used to provide a proposal, which plant protection product, i.e. which pest killer can be used. The analysis is based on the fact, whether on the transmitted pictures aphids, beetles, fleas, insects or specific eating patterns are recognizable.

The automatic picture analysis, which is done with the automatic picture processing unit 16 is oriented on reference points or reference structures on the transmitted pictures and the information within the transmitted pictures related to the plants from which a picture is taken.

It is also possible that already processed data can also be used that on the basis of pictures which have been transmitted to the central server unit 12, such picture information will then also be stored in the plant database unit 18. It is possible that this will happen only then, when a specific authorization of a qualified user has happened. Such a user may be a power-user or an employee of the system owner, whereas such user has specific knowledge with respect to plants.

In connection with plant diseases or the presence of pests, it can be possible that the specific location data can be linked with information regarding plant diseases or the presence of plant pests.

Form the information regarding location and the presence of plant diseases, pests, but also from the presence of weeds, it is possible to find out, where they are present and this information can then be forwarded. By this, the use of plant protection products can be significantly be reduced, as only the areas, which have been identified as the once with diseases or pests, can then be treated with the respective plant protection products or pest killers.

In this regard, it is possible that the system 10 for automatic recognition of plants is mounted on a plant protection product spraying machine, which is mounted or attached to an agricultural vehicle such that by working on an agricultural area, where plant protection products are needed, the plant protection product or the pest killer will then be sprayed out targeted to the respective area, where such products are needed.

It is also possible that the system 10 comprises a chat functionality, which is established between the central server unit 12 and a plurality of mobile devices 26, 28 or also comprises an expert call-center or an expert central with a chat functionality such that the users with the mobile devices 26, 28 may communicate with the experts or even between each other regarding the pictures that have been taken with the mobile devices 26, 28, whereas the pictures are related to plants, pests or plant diseases.

The information may be transmitted back by the server unit 12 to the mobile devices 26 or 28.

Also it is possible that by means of the filter module 24, either set by the user or preset by the manufacturer, only plant protection product data of a specific manufacturer will be transmitted back in connection with the recognized plant.

Generally speaking, it is also possible that after a deactivation of a filter module 24 or by respective settings of the filter module 24 all possible plant protection products or pesticides or weed killers can be searched and transmitted back by the server unit 12 via the network 14 to a mobile device 26 or 28.

REFERENCES

10 System
12 Server unit
14 Network
16 Picture processing unit
18 Plant database unit
20 Picture database unit
22 Plant protection product database
24 Filter module
26 Smartphone
28 Tablet-PC
30 Data analysis module
32 Plant disease database unit
34 Plant pest database unit

The invention claimed is:

1. A system for automatic recognition of plants, comprising:
    a central server unit;
    a network;
    an automatic picture processing unit;
    a plant database unit, in which plant data are stored;
    a picture database unit, in which picture data related to plants are stored; and a mobile device with a camera, the central server unit configured to be in use via the network with the mobile device, the camera of the mobile device configured to provide picture data of a plant and the picture data transmitted via the network to the server unit, wherein the picture data also comprise date data, the automatic picture processing unit configured to, on the basis of the transmitted picture data and date data and together with the plant database unit and the picture database unit, perform a comparison with data in the plant database unit and the picture database unit and the transmitted picture data of the plant such that the plant is defined and the definition is transmitted back to the mobile device via the network by the server unit.

2. The system according to claim 1, further comprising a plant protection product database unit in which plant protection product data are stored, wherein further in the plant protection product database unit linking data are stored, by which the plant protection product data is linked with the picture data and/or plant data by a data analysis module.

3. The system according to claim 2, wherein the plant protection product data comprise active substance data and/or manufacturer data related to a manufacturer of a plant protection product.

4. The system according to claim 3, further comprising a filter module configured to preset and/or select that only manufacturing data of a specific manufacturer of a plant protection product is to be used for the linking of plant protection data with the picture data and/or the plant data by the data analysis module.

5. The system according to claim 1, wherein the picture data also comprise location data.

6. The system according to claim 1, wherein the picture data also comprise time data.

7. The system according to claim 1, wherein the mobile device is a mobile phone.

8. The system according to claim 1, wherein the mobile device is a tablet pc.

9. The system according to claim 1, further comprising a plant disease database unit, in which plant disease data are stored, wherein further in the plant disease database unit linking data are stored, by which the plant disease data is linked with picture data and/or plant data by a data analysis module.

10. The system according to claim 1, further comprising a plant pest database unit, in which plant pest data are stored, wherein furthermore in the plant pest database unit linking data are stored, by which a plant pest data is linked with picture data and/or plant data by a data analysis module.

* * * * *